United States Patent Office 3,294,712
Patented Dec. 27, 1966

3,294,712
FLAME RESISTANT POLYURETHANE COMPOSITIONS CONTAINING $P_4S_3$ OR $P_4S_7$
Norman Jack Clark and Fred McCollough, Jr., Chicago Heights, Ill., assignors to Stauffer Chemical Company, New York, N.Y., a corporation of Delaware
No Drawing. Filed Nov. 29, 1963, Ser. No. 327,101
14 Claims. (Cl. 260—2.5)

This invention relates to flame resistant polyurethane foams, components, and process for producing same.

In particular this invention relates to polyurethane foams which have been made flame resistant by the addition and/or reaction therewith of a phosphorus compound comprising a phosphorus sulfide with or without an additional phosphorus compound containing hydroxy-terminated ester groups. A particularly preferred aspect of this invention concerns polyurethane foams which have been made flame resistant by the addition thereto of small amounts of phosphorus sesquisulfide.

When produced according to the process of this invention, the resulting flame-resistant compositions may be used in the form of expanded foamed products as thermal insulation. By using the conventional technique of foaming in place, this type of insulation has found wide use in the manufacture of refrigerators, curtain walls, and aircraft components wherein such foams add strength as well as flame resistance to the particular items.

The production of urethane or isocyanate polymers is a well-known commercial process, see for instance Kirk-Othmer, The Encyclopedia of Chemical Technology, First Supplement, pages 888 et seq. (Interscience 1957). Briefly, this process involves the reaction of an isocyanate and a second compound which may contain a hydroxyl, amino or carboxy group, i.e. a compound containing active hydrogen. As used in this specification, the term "isocyanate material" is intended to include isocyanate or urethane compositions containing unreacted —NCO radicals.

The most common polymers are formed by the reaction of toluene diisocyanate (hereafter TDI) and a saturated polyether or polyester. (This latter compound may, however, contain benzene unsaturation.) Other representative isocyanates include polymethylene polyphenyl isocyanate (hereafter PAPI) and p,p′ diphenylmethylene diisocyanate. Representative polyesters are the reaction products of adipic acid and/or phthalic anhydride and ethylene glycol. Other compounds which may be used in place of the polyesters or polyethers are simple glycols, polyglycols, castor oil, drying oils, etc. Whether the products are to be flexible or rigid depends upon the degree of cross-linking and thus the type of polyol which is used.

When an expanded or foamed flexible product is to be produced, it is often the practice to add water to the composition. The water reacts with the —NCO groups to release $CO_2$ and cause the expansion of the polymer into a foamed mass.

Control of this reaction requires considerable skill and often special equipment. When producing rigid foams for thermal insulation, it has been found advisable to use inert dissolved gases including the various halohydrocarbons such as the well-known Freons or Genetrons. These low boiling liquids boil when warmed by the heat of reaction and thus cause foaming. They also serve to lower the thermal conductivity and increase the flame resistance of the resulting foam. The term "foaming agent" as used herein is intended to include both reactive materials such as water and inert materials such as halohydrocarbons, or mixtures of the two, which cause the copolymers to form an expanded foam.

In addition to the actual reactants and foaming agents, it is also desirable in many cases to add a small amount of a surfactant in order to provide a uniform, fine cell structure.

According to the process of the present invention, the above-described urethane polymers may be made flame resistant by adding a small percentage of either $P_4S_3$ or $P_4S_7$. In particular the $P_4S_3$, commonly known as phosphorus sesquisulfide, has been found to have outstanding characteristics with respect to making urethane foams flame resistant.

It is particularly surprising that compounds of this type may serve to improve flame resistance of urethane foams since $P_4S_3$ in particular has had a primary industrial use as the principal ingredient in the heads of friction matches. See for instance Kirk-Othmer, Encyclopedia of Chemical Technology, Interscience (1953), volume 10, page 493. This compound has been advertised commercially as being a flammable, yellow powder that can be ignited by friction. These phosphorus sulfides are available commercially and the ordinary commercial grade of product is satisfactory for the purpose of this invention.

The above noted phosphorous sulfides apparently impart flame resistance to the final urethane product by virtue of being suspended, in finely divided form, in the composition and acting to reduce the flammability of the product. In view of this fact that the phosphorus sulfides apparently do not take part in the chemical reaction which forms the urethane compound they may also be used in connection with other wellknown phosphorus compounds which contain terminal hydroxyl groups on the molecule and which actually take part in the chemical reaction which produces the ultimate urethane product. Examples of such hydroxy terminating compounds are as follows.

One class of compounds may be represented by the general formula:

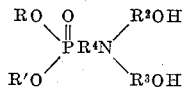

wherein R and R′ may be the same or different alkyl or haloalkyl radicals and $R^2$ and $R^3$ may be the same or different lower alkylene radicals and $R^4$ is a lower alkylene radical.

Products of the type described in the preceding formula are fully described and claimed in U.S. Patent 3,076,010.

A second class of phosphorus compounds which has been found suitable for the present invention may be represented by the following formula:

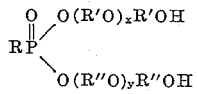

where R may be selected from the group consisting of alkyl, aryl, alkoxy, aryloxy, chloroalkyl, hydroxyalkyl, and alkanolaminoalkyl; R′ and R″ are lower alkylene radicals and $x$ and $y$ may vary from 1 to 4. These compounds are well known in the art and may be made by reacting an acidic phosphorus containing compound with an alkylene oxide according to the following equation:

$$RP(OH)_2 + xCH_2\underset{O}{\underset{\diagdown\diagup}{C}}HR' + yCH_2\underset{O}{\underset{\diagdown\diagup}{C}}HR'' \longrightarrow$$

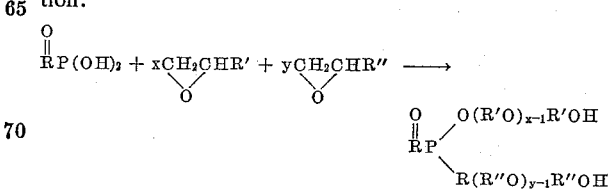

wherein R, R', and x are as defined above. It is understood, of course, that the x moles of alkylene oxide do not necessarily react symmetrically with the acidic hydrogens of the phosphorus acid.

Briefly the reaction may be described as involving the reaction of a phosphonic or phosphoric acid with an alkylene oxide. Suitable phosphoric acids are mono alkyl phosphoric acids such as methyl phosphoric acid, ethyl phosphoric acid, butyl phosphoric acid, lauryl phosphoric acid, etc. Suitable mono aryl phosphoric acids are phenyl phosphoric acid, cresyl phosphoric acid, xylyl phosphoric acid, etc. Phosphonic acids which may be used are alkyl phosphonic acids such as methylphosphonic acid, ethylphosphonic acid, and butylphosphonic acid, lauryl phosphoric acid, etc. Suitable mono aryl phosphoric acids are phenyl phosphoric acid, cresyl phosphoric acid, xylyl phosphoric acid, etc. Phosphonic acids which may be used are alkyl phosphonic acids such as methylphosphonic acid, ethylphosphonic acid, and butylphosphonic acid; chloroalkylphosphonic acids such as chloromethylphosphonic acid and trichloromethylphosphonic acid, arylphosphonic acids such as phenylphosphonic acid and cresylphosphonic acid; hydroxyalkylphosphonic acids such as hydroxymethylphosphonic acid; and alkanolaminoalkylphosphonic acids such as diethanolaminomethylphosphonic acid.

Suitable alkylene oxides which may be used are ethylene oxide, propylene oxides, butylene oxides and the like.

An example of the preparation of the above described compounds may be illustrated as follows:

*Example 1.—Preparation of polyoxyethylene phenylphosphonate*

Ethylene oxide was added to 500 grams of phenylphosphonic acid until no further reaction ensued. The temperature was held at below 70° C. during the addition. The reaction mixture was stabilized to 50° C. under 2 mm. Hg pressure. The product weighed 1122.0 grams and had an index of refraction $N_D^{25}=1.5082$.

This indicates that 4.5 moles of ethylene oxide reacted per mole of phenylphosphonic acid.

These types of compounds are more fully described and claimed in co-pending application, Serial No. 35,443, filed June 13, 1960.

The following examples illustrate the excellent results obtained when the phosphorus sulfides of the present invention are used to produce flame resistant polyurethane foams. The general method of preparing this type of foam is familiar to those associated with this art. Namely, the polyol is first blended with the silicone surfactant, a catalyst system, and "foaming agent." This mixture is then thoroughly mixed into the isocyanate component. The resulting mixture is then placed in a form and sequentially creams, rises, and cures without any additional processing requirements. According to the present invention, the phosphorus sulfide is preferably blended into the isocyanate component prior to the final mixing and foaming process.

The following specific example illustrate the process and product of the present invention:

*Example 2*

91 gms. of Selectrofoam 6402 [1] (equivalent weight =127.7), 3 gms. silicone surfactant, 1.5 gms. dimethylethanol amine, 2.0 gms. dibutyl tin dilaurate and 32.5 gms. monofluorotrichloromethane were blended together at room temperature with good agitation. In a separate container 9.0 gms. $P_4S_3$ (−70 mesh) were suspended in 111 gms. Selectrofoam 6403 [2] prepolymer (equivalent weight=142). The ratio of equivalent of polyol to equivalents of isocyanate is calculated to be 1 to 1.05.

[1] Sucrose base—propylene oxide adduct.
[2] Semi-prepolymer of Selectrofoam 6402 and excess toluene diisocyanate.

The components are mixed together with high speed agitation and poured into a form. After 14 sec. the system creams (begins to react and rise) and has stopped rising and is not sticky on the surface (tack-free) in 1½ minutes. The foam is then cured at 75° C. for 3 hours and is ready for testing. The same curing action can be accomplished if the foam is allowed to stand at room conditions for 24 hours.

*Example 3*

25 gms. diethyl N,N-diethanolaminomethylphosphonate, 73 gms. of Selectrofoam 6402, 3 gms. silicone surfactant, 1.5 gms. dimethylethanol amine, 2.0 gms. dibutyl tin dilaurate, and 32.5 gms. monofluorotrichloromethane were blended together at room temperature with good agitation. In a separate container 3.5 gms. $P_4S_3$ were suspended in 119 gms. Selectrofoam 6403 prepolymer. The ratio of equivalent of polyol to equivalents of isocyanate is calculated to be 1 to 1.05.

The components are mixed together with high speed agitation and poured into a form. After 14 sec. the system creams and has stopped rising and is not sticky on the surface in 1½ minutes. The foam is then cured at 75° C. for 3 hours and is ready for testing.

*Example 4*

The same procedure and quantities were used as in Example 3 except the amount of $P_4S_3$ was increased to 8.0 gms.

TABLE I.—FLAME TEST FOR FOAMS (ASTM-D-1692-59T)

| Foam | 1 (Exp. 2) | 2 (Exp. 3) | 3 (Exp. 4) |
|---|---|---|---|
| Retardant | $P_4S_3$ | Fyrol 6 [1]+$P_4S_3$ | Fyrol 6 [1]+$P_4S_3$. |
| Percent P | 2.0 | 2.0 | 3.0. |
| Flammability aft. aging: [2] | | | |
| 0 day | 1 3/16″ | 1 3/16″ | 0. |
| 1 day | | 2 1/16″ | 0. |
| 3 days | 5/16″ | 5″ | 1/16″. |
| 7 days | 1/4″ | | 0. |
| 14 days | 1/4″ | 5″ | 0. |

[1] Diethyl N,N-diethanolaminomethylphosphonate.
[2] Conditions were 158° F. and 100% relative humidity.

It should be noted that in Example 2 $P_4S_3$ was the only source of flame retardance; the results were better than in Example 3 wherein a combination of $P_4S_3$ and diethyl N,N - diethanolaminomethylphosphonate had the same total phosphorus and produced a foam which burned more readily. Example 4 wherein a combination of flameproofing agents was used at a phosphorus level which was 50% higher produced a satisfactory foam.

It is particularly advantageous that $P_4S_3$ be used as the sole source of flame retardance since it is a compound which does not react in the urethane formation. Varying amounts can be added to a given formulation without having to reformulate the entire mix. When working with the type of phosphorus compound which contains terminal —OH groups, it is apparent that every time it is desirable to change the total phosphorus level the whole mix must be reformulated in order that a proper urethane formulation reaction take place.

In order to demonstrate versatility of $P_4S_3$ as a flame retardant in a variety of different polyol systems, the following experiments were performed.

*Example 5*

Following the procedure described in Example 2, a foamed product was produced using 102 gms. of Polyol HP-410 (a propylene oxide adduct of methyl glucoside having an equivalent weight of 136.2) 5.5 gms. catalyst (1 part triethylene diamine dissolved in 2 parts hexanetriol, equivalent weight 65), 2.5 gms. silicone surfactant, 33 gms. monofluorotrichloromethane, 109 gms. PAPI and 4.0 gms. $P_4S_3$.

Example 6

Following the same procedure a foam was prepared using 98 gms. Selectrofoam 6406 (sucrose base polyether), 1 gm. silicone surfactant, 0.2 gm. dibutyl tin dilaurate, 35 gms. monofluorotrichloromethane, 115.8 gms. PAPI, and 2 gms. $P_4S_3$.

The results of flammability tests of the products produced in Examples 5 and 6 are shown in Table II.

TABLE II.—FLAMMABILITY OF DIFFERENT POLYOL SYSTEMS

| Foam | Percent P | Flammability After Aging (ASTM-D-1692-59T) | | | |
|---|---|---|---|---|---|
| | | 1 day | 3 days | 7 days | 14 days |
| 5 | 0.9 | 5/16" | 3/8" | 0 | 0. |
| 6 | 0.45 | 5/16" | 3/16" | 3/16" | 3/16". |

As noted previously, an advantage of using $P_4S_3$ as a flame resisting compound in urethane foams is that the proportions may be varied without changing the basic formulation of the actual reactants. In this respect, it has been found that $P_4S_3$ may be formulated, mixed, and stored in the isocyanate component for considerable periods of time with no adverse affect on the resulting foam product. This storage stability is of particular importance to manufacturers who supply customers with packaged, pre-mixed components. Such stable mixture containing the desired amount of phosphorus sulfide may be supplied directly. This eliminates a compounding and proportioning problem for the manufacturer.

In contrast, it appears that $P_4S_3$ should not be mixed with the polyol component before storage since there is an apparent reaction with the catalyst which is normally present in the polyol component. Storage tests have shown that $P_4S_3$ may be successfully stored in an isocyanate component for at least 4 weeks without appreciably affecting the cream time when the polyol was subsequently foamed.

Tests made on various foams produced using $P_4S_3$ as the flame resisting compound show that it has little or no effect on the resulting dimensional stability of the foams. Foams which were stored under aging conditions of 157° F. and 100% relative humidity for periods up to 14 days show that there was little difference in the dimensional stability of foams containing no $P_4S_3$ as compared with those containing sufficient $P_4S_3$ to furnish up to 0.9% phosphorus in the formulation.

Since $P_4S_3$ does not react with the foam components, it is necessary to obtain a finely divided suspension of this material throughout the foam in order to provide adequate flame resistance. In order to obtain this result we have found that it is preferable to reduce the particle size of the $P_4S_3$ to at least 70 mesh or less. By reducing the particle size to this level, it is possible to minimize sedimentation, minimize plugging in the small orifices used in mixing heads, and in general obtain a better distribution of the $P_4S_3$ throughout the final product. Where long periods of holding are necessary, during formulation it is often advisable to maintain the $P_4S_3$ in suspension in the isocyanates by the use of additional agitation.

The foregoing examples have dealt primarily with the use of $P_4S_3$ in making urethane foam flame resistant. We have also found, however, that $P_4S_7$ may be used advantageously in some instances. It is not generally as effective a flame retardant based upon the total amount of phosphorus present in the foam. We have found that maximum flame resistance is effected when the amount of phosphorus sulfide present in the foam is sufficient to obtain between 2 and 2.5% phosphorus in the final composition. Some advantages are obtained, however, in certain formulations when using as little as 0.25% to 0.5% phosphorus in the final composition. This level will make many foams self-extinguishing. Since the degree of flame resistance desired will vary with different applications and since most of the commercially produced foam systems have individual requirements with respect to proper flame retarding, some experimentation may be necessary in order to determine the proper use level. Such experimentation is well within the skill of persons familiar with this art and is in certain instances a matter of individual choice.

In Tables I and II reference is made to the flame test ASTM-D-1692-59T. This test was performed as follows:

Specimens were cut from various parts of the foam block. They were trimmed on a bandsaw to ½" x 6" x 2" dimensions. Marks were made on top of the specimens 1" from the 2" wide ends. The specimens were rested on a piece of ¼" hardware cloth (galvanized steel woven wire screen having mesh openings approximately ¼" squares) which measured 3" x 8". One 3" end of the screen was bent up 90° for ½". The 2" end of the foam sample was placed against this turned-up end. The screen and samples were placed in a draft-free chamber. A Bunsen burner with a wing tip which had a 1½" high flame was placed ½" below the turned-up screen end. When the flame front reached the first one-inch mark on the top of the foam specimen, the gas burner was turned off and a stopwatch was started. The watch was stopped when the flame went out or reached the second mark on the top of the specimen. The time interval and the length of the foam charred or burned (measured on the top of the specimen from the first one-inch mark) were recorded. A minimum of ten tests was run on each foam.

The foregoing description is given for clearness of understanding only and no unnecessary limitations should be derived therefrom.

We claim:

1. A flame resistant urethane composition comprising a polyurethane foam and a phosphorus sulfide selected from the class consisting of $P_4S_3$ and $P_4S_7$.

2. A flame resistant urethane composition according to claim 1 wherein the phosphorus sulfide is $P_4S_3$.

3. A flame resistant urethane composition according to claim 1 wherein the phosphorus sulfide is $P_4S_7$.

4. A flame resistant urethane composition according to claim 1 wherein the amount of phosphorus sulfide present is sufficient to provide between about 0.25 and 2.5% phosphorus in the final composition.

5. A flame resistant urethane composition comprising:
   (A) a polyurethane foam consisting of the reaction product of an organic polyisocyanate a blowing agent and a hydroxy terminated phosphorus compound selected from the class consisting of
      (a) a dialkyl dialkanolaminoalkylphosphonate having the formula:

$$\begin{array}{c} RO \quad O \quad R_2OH \\ \diagdown \, \| \, \diagup \\ P\text{—}R_4N \\ \diagup \quad \diagdown \\ R_1O \quad \quad R_3OH \end{array}$$

wherein R and $R_1$ are selected from the group consisting of lower alkyl and lower haloalkyl radicals, and $R_2$, $R_3$ and $R_4$ are lower alkylene radicals; and
      (b) a phosphorus compound of the formula:

$$\begin{array}{c} O \quad O(R_1O)_xR_1OH \\ \| \, \diagup \\ R\text{—}P \\ \diagdown \\ \quad O(R_2O)_yR_2OH \end{array}$$

wherein R is a member of the class consisting of alkyl, aryl, alkoxy, aryloxy, chloroalkyl, hydroxy alkyl and alkanolaminoalkyl; $R_1$ and $R_2$ are lower alkylene radicals; and $x$ and $y$ may vary from 1 to about 4, and
   (B) a phosphorus sulfide selected from the class consisting of $P_4S_3$ and $P_4S_7$ dispersed throughout said polyurethane foam.

6. A flame resistant urethane composition according to claim 5 wherein the hydroxy terminated phosphorus compound is diethyl N,N-diethanolaminomethylphosphonate and the phosphorus sulfide is $P_4S_3$.

7. A flame resistant urethane composition according to claim 5 wherein the phosphorus sulfide and hydroxy terminated phosphorus compound are present in proportions to provide a total of between about 0.25 and 2.5% phosphorus in the final composition.

8. A flame resistant urethane composition comprising a polyurethane foam prepared from toluene diisocyanate as the isocyanate reactant and $P_4S_3$ as a flame retardant.

9. A flame resistant urethane composition comprising a polyurethane foam prepared from polymethylene polyphenyl isocyanate as the isocyanate reactant and $P_4S_3$ as the flame retardant.

10. A flame resistant urethane composition comprising a polyurethane foam prepared from p,p' diphenylmethylene diisocyanate as the isocyanate reactant and $P_4S_3$ as the flame retardant.

11. A flame resistant urethane composition comprising a polyurethane foam prepared from toluene diisocyanate as the isocyanate reactant, $P_4S_3$ and diethyl N,N-diethanolaminomethylphosphonate, the proportions of phosphorus containing compounds being sufficient to furnish from about 0.25 to about 2.5% phosphorus in the final composition.

12. A flame resistant urethane composition comprising a polyurethane foam prepared from polymethylene polyphenyl isocyanate as the isocyanate reactant, $P_4S_3$ and diethyl N,N-diethanolaminomethylphosphonate, the phosphorous containing compounds being present in proportions sufficient to furnish from about 0.25 to about 2.5% phosphorus in the final composition.

13. A flame resistant urethane composition comprising a polyurethane foam prepared from p,p' diphenyl methylene diisocyanate as the isocyanate reactant, $P_4S_3$ and diethyl N,N-diethanolaminomethylphosphonate, the phosphorous containing compounds being present in proportions sufficient to furnish from about 0.25 to about 2.5% phosphorus in the final composition.

14. A process for preparing a flame resistant urethane foam composition comprising reacting an organic polyisocyanate and a urethane forming composition containing active hydrogen in the presence of a foaming agent and a flameproofing amount of a phosphorus sulfide selected from the class containing of $P_4S_3$ and $P_4S_7$.

References Cited by the Examiner
UNITED STATES PATENTS 3,076,010   1/1963   Beck _____ 260—2.5 XR

OTHER REFERENCES

Mellor "Modern Inorganic Chemistry," pages 590 and 591, published in 1917, published by Longmans, Green & Co., London.

LEON J. BERCOVITZ, *Primary Examiner.*

DONALD E. CZAJA, *Examiner.*

UNITED STATES PATENT OFFICE
CERTIFICATE OF CORRECTION

Patent No. 3,294,712                        December 27, 1966

Norman Jack Clark et al.

It is hereby certified that error appears in the above numbered patent requiring correction and that the said Letters Patent should read as corrected below.

Column 8, line 16, for "containing" read -- consisting --.

Signed and sealed this 12th day of September 1967.

(SEAL)
Attest:

ERNEST W. SWIDER                        EDWARD J. BRENNER
Attesting Officer                         Commissioner of Patents